United States Patent [19]

Ravella

[11] Patent Number: 5,677,028
[45] Date of Patent: Oct. 14, 1997

[54] ABSORBENT MATERIAL

[75] Inventor: Joseph A. Ravella, Rougemont, N.C.

[73] Assignee: Wearever Health Care Products, LLC, Rougemont, N.C.

[21] Appl. No.: 629,975

[22] Filed: Apr. 9, 1996

[51] Int. Cl.$^6$ .................................................. B32B 3/06
[52] U.S. Cl. ..................... 428/102; 428/212; 428/220; 442/118; 442/123; 442/388; 442/403
[58] Field of Search ..................................... 428/102, 212, 428/220; 442/118, 123, 388, 403; 156/148, 62.6, 209; 28/107, 112

[56] References Cited

U.S. PATENT DOCUMENTS

| | | | |
|---|---|---|---|
| 3,284,273 | 11/1966 | Prentice | 161/83 |
| 3,881,488 | 5/1975 | Delanty et al. | 128/287 |
| 3,886,941 | 6/1975 | Duane et al. | 128/287 |
| 3,888,256 | 6/1975 | Studinger | 128/296.3 |
| 4,077,410 | 3/1978 | Butterworth et al. | 128/287 |
| 4,402,690 | 9/1983 | Redfern | 604/391 |
| 4,718,899 | 1/1988 | Itoh et al. | 604/368 |
| 4,772,281 | 9/1988 | Armstead | 604/358 |
| 4,800,677 | 1/1989 | Mack | 119/1 |
| 4,913,954 | 4/1990 | Mack | 428/213 |
| 4,961,982 | 10/1990 | Taylor | 428/41 |
| 5,104,703 | 4/1992 | Rachman et al. | 428/35.6 |
| 5,149,408 | 9/1992 | Perlman | 204/182.3 |
| 5,171,237 | 12/1992 | Poccia et al. | 604/379 |
| 5,188,624 | 2/1993 | Young, Sr. et al. | 604/378 |
| 5,229,191 | 7/1993 | Austin | 428/198 |
| 5,252,374 | 10/1993 | Larsonneur | 428/77 |
| 5,281,207 | 1/1994 | Chmielewski et al. | 604/378 |
| 5,296,290 | 3/1994 | Brassington | 428/300 |
| 5,297,296 | 3/1994 | Moretz et al. | 2/237 |
| 5,356,403 | 10/1994 | Faulks et al. | 604/378 |

FOREIGN PATENT DOCUMENTS

| | | | |
|---|---|---|---|
| 0388062 | 9/1990 | European Pat. Off. | D04H 1/46 |
| 0388072 | 9/1990 | European Pat. Off. | D04H 1/48 |
| 0396296 | 11/1990 | European Pat. Off. | D04H 1/48 |
| 9322486 | 11/1993 | WIPO | D04H 1/54 |
| 9607783 | 3/1996 | WIPO | D04H 13/00 |

*Primary Examiner*—James J. Bell
*Attorney, Agent, or Firm*—Michael G. Johnston; Moore & Van Allen, PLLC

[57] ABSTRACT

An absorbent material and method for making same comprising a fiber web, including a fiber blend comprising from about 50 to about 75 weight percent of a fiber having fineness less than about 3 denier and from about 25 to about 50 weight percent of a fiber having fineness ranging from about 3 to about 5 denier wherein the fiber web is bound together by fiber bundles transverse to the plane of the web. The fiber blend may further comprise from about 3 to about 7 percent by weight of a fiber having fineness greater than about 5 denier. The fibers comprising the fiber blend may be entirely hydrophobic, or the about 3 to about 5 denier fiber may be hydrophilic. The absorbent material exhibits a high degree of absorption and fluid retention and does not wet back even under compression. The transverse fiber bundles formed during the mechanical bonding of the web function as wicks for transferring fluid from the surface of the material to the inner portion of the material. The fiber bundles also act as support structures resisting compression and maintaining void space and absorbent surface area within the material, even when wet. The material is reusable and is strong enough to withstand numerous washings. The material is useful as a component of reusable absorbent products further comprising an outer layer or body-side layer. The outer layer may be fluid impermeable, gas permeable or both.

23 Claims, No Drawings

5,677,028

ABSORBENT MATERIAL

BACKGROUND

This invention generally relates to an absorbent material, and more particularly concerns an absorbent material for use in reusable adsorbent articles for the absorption of body fluids as in medical or hygienic absorbents, for example in incontinence products, surgical dressings and sanitary products.

Absorbent materials are commonly characterized by their capacity to absorb large quantities of fluid per unit weight of material. A high degree of fluid retention is also advantageous, so that absorbed fluid is not easily released when the product is subjected to external pressure, a phenomenon known as "wetting back." Wetting back occurs when pressure is exerted onto an absorbent material wherein fluids absorbed in the material flow back to and re-wet the surface of the material. Where an absorbent material exhibits a high degree of fluid retention and no wetting back, the moisture stays trapped within the absorbent material and does not again contact the user.

Generally, absorbent materials exhibiting a high absorbent capacity are available as disposable products. Disposable products have heretofore proven capable of trapping fluids within the material and away from the user with no "wetting back." The effect is the user stays dry even after fluid is released.

Reusable absorbent materials commonly comprise textile fabrics due to the requirement that the materials must be washed and dried between uses. Reusable absorbent products have in the past been unremarkable in terms of their absorbent capacity. It is true that absorbent materials including hydrophilic fibers tend to absorb a lot of fluid. However, when fluid is absorbed by and wets fabric comprising hydrophilic fibers, there arises a tendency in hydrophilic fibers to lose strength and collapse causing the fabric to mat down. Void space in the fabric is thereby lost, reducing thickness and limiting the further mount of fluid which can be absorbed. Thus, even though the use of hydrophilic fibers enhances absorbency, absorbent materials including hydrophilic fibers tend to have less than optimum absorbency due to wet collapse.

Because of the proclivity of reusable absorbent materials to wet collapse, reusable absorbent materials tend to wet back, especially under compression. Since absorbed fluid may be forced out of reusable absorbent material by pressure, reusable absorbent products have been unable to produce a stay-dry effect with no wetting back.

Further, reusable absorbent products have proven to be uncomfortable. When a material comprising textile fabrics gets wet it stays wet throughout its entire thickness so that if a user wearing an incontinence garment releases fluid, the wet fabric stays against the user's skin.

Hence reusable absorbent products have heretofore not been accepted as a satisfactory replacement for disposable absorbent products.

For the foregoing reasons, there is a need for a reusable absorbent material exhibiting a high degree of absorbency for removing fluid from the surface of the absorbent material and away from the user's skin. The material must move the liquid rapidly and permanently away from the surface with no wetting back thereby providing a dry surface against the user. The reusable absorbent material having this stay-dry effect must also be easy to manufacture.

SUMMARY

An absorbent material having features of the present invention which satisfies these needs comprises a fiber web including a blend of fibers, the fiber blend comprising from about 50 to about 75 weight percent of a fiber having fineness less than about 3 denier and from about 25 to about 50 weight percent of a fiber having fineness ranging from about 3 to about 5 denier, based on a total weight of the blend, wherein the fiber web is bonded together by fiber bundles transverse to the plane of the web. The fiber blend comprising the absorbent material may further comprise from about 3 to about 7 percent by weight of a fiber having fineness greater than about 5 denier, based on a total weight of the blend. The fibers comprising the fiber blend may be entirely hydrophobic, or the about 3 to about 5 denier fiber may be hydrophilic.

The present invention fulfills the needs in the art by also providing a method for making an absorbent material, the method comprising the steps of forming a fiber web, the fiber web comprising from about 50 to about 75 percent by weight of a fiber having fineness less than about 3 denier and from about 25 to about 50 percent by weight of a fiber having fineness ranging from about 3 to about 5 denier, based on a total weight of the blend, and mechanically bonding the web providing fiber bundles transverse to the plane of the web. Alternatively, the fiber web forming step may comprise forming a web including from about 50 to about 75 percent by weight of a fiber having fineness less than about 3 denier, from about 25 to about 50 percent by weight of a fiber having fineness ranging from about 3 to about 5 denier, and from about 3 to about 7 percent by weight of a fiber having fineness greater than about 5 denier, based on a total weight of the blend. The mechanical bonding step preferably comprises needle punching which may be suitably carried out in accordance with the present invention at a needle punch density ranging from about 700 to about 900 penetrations per square inch. Further, the method may further comprise the step of cross-lapping the web to from a layered batt having at least about 8 layers such that the weight of the material is about 8 to about 16 ounces per square yard.

The present invention also overcomes the drawbacks of using reusable absorbent products through the provision of an absorbent article including an outer layer and an absorbent layer disposed against the outer layer, the absorbent layer comprising a fiber web including a blend of fibers, the fiber blend comprising from about 50 to about 75 weight percent of a fiber having fineness less than about 3 denier and from about 25 to about 50 weight percent of a fiber having fineness ranging from about 3 to about 5 denier, based on a total weight of the blend, wherein the fiber web is bonded together by fiber bundles transverse to the plane of the web. The outer layer may be fluid impermeable and gas permeable or slip-resistant. The absorbent article may further comprise a body-side layer wherein the absorbent layer is disposed between the outer layer and the body-side layer. In such construction, the body-side layer and the absorbent layer can be held together by stitch means defining a quilted construction.

Accordingly, it is an object of the present invention to provide a new absorbent material having one or more of the novel features as set forth above or hereinafter shown or described.

It is another object of the present invention to provide a method for making a new absorbent material having one or more of the novel features as set forth above or hereinafter shown or described.

Further it is an object of the present invention to provide an absorbent material and a method for making same which material exhibits a high degree of fluid retention.

A related object of the present invention is to provide an absorbent material and a method for making same which does not wet back even under compression.

Still further it is an object of the present invention to provide an absorbent material and a method for making the same which rapidly and permanently removes fluid away from the surface to the inner portion of the material.

Still another object of the present invention is to provide an absorbent material and method for making same which provides the user thereof with a stay dry effect after a release of fluid.

Moreover an object of the present invention is to provide an absorbent material with a high absorbent capacity.

Yet another object of the present invention is to provide an absorbent material and a method for making same for use as a reusable absorbent article.

Also an object of the present invention is to provide a simple manufacturing method for making the new absorbent material of the present invention.

A feature of the present invention is the fiber blend used. A high percentage of a fine denier fiber is employed to provide surface area for fluid absorbency and retention. Also included in the blend is a medium denier fiber which acts as a carrying fiber for the fine fiber during processing and provides structural integrity to the finished material. A small percentage of coarse fiber may be added to the blend to further enhance the structural integrity of the material and provide resistance to wet collapse and wetting back.

Another feature of the present invention is the fiber bundles transverse to the plane of the web formed during the mechanical bonding of the web. The fiber bundles function as wicks for transferring fluid from the surface of the material to the inner portion of the material. The fiber bundles also act as support structures resisting compression of the bulk fiber matrix thereby maintaining void space and absorbent surface area within the material, even when wet.

The absorbent material of the present invention is highly absorbent. At the same time, we have observed that the material shows the ability to quickly remove fluid from the surface of the absorbent material and retain the fluid away from the user's skin even under pressure. The material does not wet back resulting in a dry surface against the user shortly after fluid release. The method of making the absorbent material of the present invention is a simple, efficient productive manufacturing process. Moreover, the material may be incorporated into any number of absorbent articles, is reusable and is strong enough to withstand numerous washings.

These and other objects, features and advantages of the present invention will become apparent upon reading the following detailed description and appended claims.

DESCRIPTION

The present invention is an absorbent material comprising a non-woven fiber blend. The material comprises one or more intimately blended fiber web layers formed by carding and cross-lapping. The web is mechanically bound by needle punching to a predetermined thickness and density through a proper combination of overall fiber weight and needle punch density. The interior portion of the needle punched material comprises a substantial majority of fibers extending generally in the horizontal plane of the material. Needle punching produces a plurality of fiber bundles extending in a direction generally transverse, or vertical, to the plane of the material for transporting fluid on the surface to the interior portion of the material. The finished product of the present invention is a non-woven absorbent material having a heretofore unseen level of absorbency.

The absorbent material in accordance with the present invention may be constituted wholly by hydrophobic fibers, particularly fibers which are inherently hydrophobic throughout, or a mixture of hydrophobic and hydrophilic fibers. More specifically, the absorbent material comprises a fiber blend including from about 50% to about 100% hydrophobic fibers, and from about 0% to about 50% of a naturally hydrophilic fiber.

The hydrophobic fibers may be natural hydrophobic fibers or synthetic staple fibers such as polyethylene, polypropylene, nylon and the like. For use in the present invention, the hydrophobic fiber must be strong, both wet and dry. Preferably, polyester fibers are used as the hydrophobic fiber. A synthetic hydrophobic fiber, such as polyester, owes any inherent hydrophilicity to surface tension. Use of hydrophobic fibers in the material of the present invention results in a very resilient structure which maintains its loft when wet thereby providing void space and surface area within the material for fluid absorbance.

The hydrophobic fibers may be treated with a hydrophilic finish, which finish may be applied to the hydrophobic fiber during fiber drawing or fiber blending. A suitable hydrophilic finish for use in the drawing operation of the present invention is available from Goulstan in Monroe, N.C., U.S.A., under the name NF 2344. For use in the fiber blending operation, a hydrophilic finish referred to as Lurol 4126 is also available from Goulstan. Alternatively, prefinished fibers may be purchased from a supplier. It is understood that even though the hydrophobic fiber has been coated with a hydrophilic finish, the hydrophobic fiber remains inherently hydrophobic.

The naturally hydrophilic fibers are preferably rayon fibers, or viscose, but may also be any other naturally hydrophilic fibers such as cotton fibers, pulp fibers, and the like, or mixtures thereof.

The fiber web manufactured in accordance with the invention is formed from a homogenous blend of the above fibers comprising fine denier fiber and medium denier fiber. Preferably, the fine denier fiber is less than about 3 denier and, ideally, the fine denier fiber is as fine as possible. However, use of fiber having extreme fineness becomes prohibitively expensive. Thus, the lower limit for the fine denier fiber is somewhat limited by practicality and cost.

The fine fibers comprise a major proportion of the blend, ranging from about 50% to about 75% by weight of the blend, based on a total weight of the blend, preferably from about 60% to about 70%, and more preferably about 70% of the blend by weight. The fine denier fiber provides the basic structure of the fabric and is the primary absorbent fiber in the blend. Having a major proportion of fine denier fiber enhances the number of interstices and surface area within the blend for holding fluid thereby contributing to interfiber absorption. When the fine denier fiber is below about 50% of the blend by weight, the absorbent capacity of the resulting fabric is reduced. However, above about 75% of the blend by weight the void space within the fabric becomes significantly reduced diminishing the ability of the fluid to move through the fabric. Production rate and the cost of manufacturing are also adversely affected. A suitable fiber for use as the fine fiber is sold as Type 54 polyester by DuPont de Nemours, Inc., of Wilmington, Del., U.S.A.

The medium denier fiber has a fineness ranging from about 3 denier to about 5 denier, and preferably has a fineness of about 3 denier. The medium denier fiber comprises from about 25% to about 50% by weight of the blend, based on a total weight of the blend, preferably from about 25% to about 30%, and more preferably about 30% of the blend by weight. In the present invention, the primary function of the medium denier fiber is as a "carrying fiber" to provide structural support to the fine denier fiber during processing. When the medium denier fiber is below about 25% of the blend by weight, there is a reduction in productivity. Above about 50%, productivity is improved but fiber surface area available for absorption in the form of the fine denier fibers is sacrificed. The medium denier fiber also has some of the attributes of the fine denier fibers, providing absorbency to the material, and contributes to the structural support of the finished absorbent material. A fiber suitable for use as the medium denier fiber is Type 794 polyester available from DuPont de Nemours, Inc., of Wilmington, Del., U.S.A.

Alternatively, the medium denier fiber may comprise a naturally hydrophilic fiber. The fiber blend including naturally hydrophilic medium denier fibers is primarily intended for use as a component of body worn products. As noted above, naturally hydrophilic fiber tends to assimilate released fluid, which is more suitable for a body worn component because the absorbed fluid has even less tendency to wet back. A suitable natural hydrophilic material is rayon which is available from Foss Manufacturing Company, Inc. of Hampton, N.H., U.S.A.

In accordance with the present invention, the fiber blend may further comprise a coarse denier fiber having a fineness of at least about 5 denier. The coarse denier fiber, although only a small proportion of the blend, adds to the structural integrity of the finished product by providing compression resistance thereby maintaining the loft of the product, especially when wet. This is known as gauge retention or "scaffolding". A fiber having a denier less than about 5 does not provide sufficient structural support to the resulting material. However, when using thick fibers, the structural benefits of the thicker fiber are outweighed by the loss of handleability of the web.

The coarse denier fiber comprises the smallest proportion of the fiber blend, ranging from about 3% to about 7% by weight of the blend, based on a total weight of the blend, preferably from about 4% to about 6%, and more preferably about 5% of the blend by weight. When the coarse denier fiber is above about 7% of the blend by weight, the fabric as a whole loses surface area for absorption. Below about 3% by weight, the benefits of structural integrity provided by the coarse fiber is reduced. Preferably the coarse fibers are polyester, thereby hydrophobic by nature and unaffected by fluid and possessing good wet strength. Thus, the coarse fibers tend to oppose any wet collapse or compressive forces for the prevention of wet back, and maintain the gauge of the product conserving void spaces within the fabric for absorption. The particular fiber used for the coarse fabric is available from Foss Manufacturing Company, Inc. of Hampton, N.H., U.S.A., under the name of White 550 polyester.

The fibers comprising the fiber blend have lengths suitably ranging from about 1.5 inches to about 4 inches, preferably from about 1.5 inches to about 3 inches, and more preferably about 3 inches. Length is important from a processing standpoint. Above about 4 inches the fiber is too long for needle punching and tends to pull out or break, shredding the fabric and creating lint and dust. Below about 1.5 inches, the structural integrity of the fiber decreases.

The method of making the absorbent material of the present invention comprises forming a non-woven fiber web comprising a blend of the above fibers and subjecting the web to mechanical bonding providing fiber bundles transverse to the plane of the web. Thereafter, the web may optionally be subjected to heat treatment by rolling over a heated calendar roll to heat shrink and tighten the surface fibers. The latter step does not enhance the absorbent performance of the product.

The non-woven fiber web may be formed from the fiber blend by well-known methods, such as for example, using carding techniques. The web can be cross-lapped to provide a web with a plurality of layers having a predetermined combined weight. In the production of the absorbent material of the present invention, the web has between about 8 layers and about 16 layers, preferably between about 12 layers and about 14 layers and more preferably about 13 layers. Of course web-making is susceptible to numerous variations. For example, although carded webs are described in the present process, it is understood that carded webs can be preformed and supplied as mils of preformed webs. Non-woven webs, other than carded webs which have been formed by air laying, garnetting, and similar processes known in the art, can also be employed.

The web is mechanically bound, preferably by subjecting the web to a needling punching operation. As is known in the art, needle punching is a form of mechanical bonding wherein a multiplicity of rapidly reciprocating barbed needles are driven a controlled distance through a base web thereby reinforcing the web. The barbed needles have a portion close to the point of the needle which is free from barbs and another portion which is provided with barbs. Small bundles of fibers within the web are caught on the barbs during the forward or reverse movement, respectively, of the needle, or both depending on the type of needle used, and are either pushed forward or drawn backward through the web thereby forming numerous small loci of fiber entanglement. As the needles move away from the base web the fiber bundles slide clear of the needle barbs without untangling the transverse interlocked fiber bonds.

The mechanical bonding step of the method according to the present invention may be carried out on any type of conventional needle punch loom. The loom may needle punch either from above or from below, or a combination of the two. Preferably, the needle punching operation according to the present invention is performed from both sides using an up-punch loom and a down-punch loom. Although any needle punching configuration used for needle punch lines or operations can be used, this preferred process results in only one pass to needle both sides.

The needle punching process results in needles penetrating the surfaces of the fiber web and carrying fiber bundles transversely through the web. The needle punching may be carried to similar penetration depths on each side of the web so that a symmetrical absorbent material is obtained, or different penetrations depths may be used. The purpose of the needle punching step is to bind the web layers together and provide a structure having a reduced gauge with binding fiber bundles extending inwardly in a direction generally transverse to the plane of the web for holding the layers together.

The particular effects of the needle punching operation, and specifically the density of the needle punched material, can be controlled, as is known in the art, by adjusting the needle punch density, depth of needle penetration, needle type, fiber type and the proportion of fibers. Generally, the preferred finished density of the absorbent material of the present invention provides for a very loose construction.

While needle punching at a higher density, that is, more needle penetrations per square inch, will generally strengthen the material, a higher needle punching density also produces greater compaction of the absorbent material resulting in a decrease of overall absorbent capacity. The resulting structure also becomes more rigid resulting in discomfort to the user. However, there is a point where the material will lose its integrity if needled too loosely. Thus, the preferred density is that density which results in a material which has sufficient structural integrity for its use as a reusable component of an absorbent product with maximum interior void space and surface area for absorption wherein maximum absorption capacity is achieved.

For the purposes of the present invention, the needle punch density utilized is between about 700 and about 900 penetrations per square inch, preferably between about 750 and about 850 penetrations per square inch, and more preferably about 840 penetrations per square inch. Above about 900 penetrations per square inch, the material is needle punched too densely reducing the interior void volume and associated absorbency. Conversely, below about 700 penetrations per square inch, the material is needle punched too loosely and the benefit of increased absorbency is offset by the lack of internal bond strength needed to hold the material together.

It is understood that a tremendous variety of needles are available and that the needle punch density effect described above could be achieved any number of ways using different needle types. For example, suitable needles for the purposes of the present invention include about 38 gauge to about 40 gauge regular barb felting needles for use in the down-punch loom, and about 38 gauge to about 40 gauge closed barb felting needles in the up-punch loom.

As discussed above, during the needle punching process fibers in the plane of the web engaged by the needle barbs are carried by the barbs and redistributed to the vertical axis, while those fibers which the needles do not strike remain substantially in their original orientation. The inner or middle portion of the material thus has a majority of fibers substantially in the plane of the web. The inner portion also tends to remain very loose so that the material is capable of absorbing and holding fluid. The horizontal orientation of the fibers acts to trap the fluid and positively move fluid on a longitudinal axis horizontally through the material rather than puddling and causing a wet area.

The fibers which are redistributed vertically by needling extend through the material and serve as wicks along which fluid may be carried from the outer surface of the absorbent material into the inner portion. These fiber bundles act as capillaries when moisture is present on the surface. Because the bundles essentially stand vertically through the pad, they carry the liquid down into the horizontally oriented fibers. The wicks thus function to enhance fluid transfer between the surface and the interior of the material. Fibers laying in the horizontal plane of the fabric rapidly transfer the fluid longitudinally throughout the pad thereby spreading the fluid throughout the material. Thus, the fluid is taken from the top surface by the vertical fiber bundles and into the core of the material where it then moves out laterally. In effect, vertical fluid pathways access horizontal fluid pathways to provide absorbency to the material. Because the vertical fiber bundles act as wicks to guide the fluid from the outside layer to the inner portion of the material, the outside layer effectively remains dry even after fluid is released by the user.

While the preferred method for mechanically bonding the fiber web in preparing the absorbent material of the present invention is needle punching, it is understood that needle punching is not the only means by which fibers from within the fibrous layer can be caused to form the wicks in accordance with the invention. For example, wicks can be formed by means for quilting, stitch bonding, air jets or hydroentanglement, using very high pressure water jets directed at one or both free faces of superimposed fibrous webs. In any case, the purpose is to bond the web forming vertical fiber bundles to transfer liquid to the interior portion of the material where the liquid is transported from the point of discharge throughout the material. The vertical fiber bundles also provide structural support to the finished material to keep the material from collapsing, even when wet. This compression resistance maintains the void space and fiber surface area within the pad which results in more volume available for fluid absorbance. Through the combined effect of the vertical bundles providing structural integrity and fluid transfer into the interior of the fabric and the horizontal fiber layers spreading fluid throughout the inside of the fabric, wet back is prevented even under pressure because the fluid remains trapped within the material. As noted above, use of hydrophobic fibers in the fiber blend, and particularly the coarse fibers, also adds to the compression resistance and helps maintain the structure of the material during use, especially when the material becomes wet.

The absorbent material of the present invention has a finished weight of about 10 to about 15 ounces per square yard, preferably about 12 to about 14 ounces per square yard, and more preferably about 13 ounces per square yard.

The thickness of the finished product largely depends on the loom configuration and needle length. Although, if needle punched too thinly, the material is less absorbent and the ability to provide structural integrity to the material through needle punching is lessened. If needle punched too thickly, the needle punching becomes less efficient and the material loses the benefits of the vertical bundles for moving the fluid to the interior region. The thickness of the absorbent material of the present invention can range from about 0.130 inches to about 0.230 inches, and is preferably about 0.18 inches.

Optionally, the needle punched web may also be subjected to a heated cylinder roll, which is suitably carried out by passing the web slowly over a heated calendar roll to press and smooth one surface. The hot roll tends to provide a smooth lint free surface which is important in some applications. The fiber thereafter has a noticeable difference in tightness, and good drape and handle. Without heat, the fabric is prone to have a more loose surface. The heat treatment also helps in the shrinkage of the fibers for improved overall durability of the fabric and protects against post-use shrinkage. Heat setting or preshrinking of the material adds to its longevity because it prevents any chance of the fabric deforming in laundering or drycleaning operations which allows marketing of a product by size without fear of shrinking during use and reuse. Exposure to the heated calendar roll, however, does not enhance the absorbent performance of the material.

The absorption capacity of a material is typically measured as a percentage of its original weight after the fabric is saturated with a physiological saline solution. Excess liquid is allowed to run off for a given period, and then the finished piece is weighed and the difference between the weight of the finished piece and the weight of the saturated piece as a percentage of its original weight is calculated as a measure of absorbency. It is unusual to find a non-woven absorbent product having an absorption capacity consistently above 800%. We have observed that the material of the present invention has an absorption capacity of at least 800%, and has achieved absorption capacities of about 1300%. For example, a 36-inch square piece of material weighing 13 ounces per square yard can absorb about one hundred thirty ounces (130 oz.) by weight of fluid. In other words, the 36-square inch piece of material incorporated into a garment or bed pad can absorb about one gallon, more fluid than most users can discharge in a day.

The absorbent material of the present invention may be used in any number of absorbent articles and products, either alone or as a composite. In one aspect, the reusable absorbent material of the present invention may be incorporated into a final product for use in medical or hygienic adsorbents for the absorption of body fluids, for example in incontinence products especially undergarments and briefs, baby diapers, absorbent pads, surgical dressings and sanitary products.

At a mimimum, absorbent articles comprise a layer of absorbent material. The articles may also be provided with a moisture impervious outer layer to protect clothing or whatever object in the physical surroundings which the article may contact. The outer layer is typically a plastic sheet, such as polyethylene or propylene, which is normally stitched or adhesively attached to the material. Alternatively, an impermeable outer layer may be applied as a hot liquid as a final step in the method of making the absorbent material of the present invention. In this application step, hot liquid urethane or vinyl is coated on a surface of the material following the needle punching or can rolling step. The urethane or vinyl is allowed to cool forming an impermeable surface on the absorbent material. The material of the present invention thus demonstrates the unique structural strength and heat resistance to accommodate this process without burning, melting or shrinking.

Preferably, the outer layer material, in addition to being fluid impermeable, is also gas permeable. In this configuration, the absorbent article is rendered "breathable." The term "breathable" as used Herein means that the gas permeable outer layer allows passive airflow through the article permitting air to freely associate with the layers of the article. Any suitable material exhibiting fluid impermeable, gas permeable properties may be used. Preferably the material is lightweight to facilitate the handling of the absorbent article. An example of a material usable as the outer layer is GORETEX® which is manufactured by and available from W. L. Gore Company of Elkton, Md., USA. The breathable outer layer, by allowing passive airflow through the absorbent article, facilitates drying of the material and reduces heat build-up near the user's skin thereby reducing or eliminating conditions which lead to or aggravate skin irritation, bed sores and the like. Because the absorbent article can dry quickly without removing the user therefrom, the absorbent capacity of the article is not limited by the amount of retained moisture. As a result of this advantage, the article incorporating the material of the present invention has to be changed and washed less often than previous absorbent products and is therefore less expensive to use.

Absorbent pads may also be provided with a slip-resistant outer layer to prevent the pads from slipping out of position when a user moves about while sitting, lying or standing on the pad, which ensures protection of the underlying article from, for example, the incontinent user's excrements or fluids. To accomplish slip-resistance, the underside of the moisture impermeable layer can be treated with a slip-resistant coating while retaining the moisture impermeable characteristics of the bottom layer and at the same time preventing slippage of the pad. Any suitable slip-resistant coating can be used as is well known in the art. Preferably, the slip-resistant coating is polyvinyl chloride which is available from Bradford Industries of Lowell, Mass., U.S.A.

Optionally a layer of soft, non-reflective, non-abrasive material may be positioned over the absorbent material and next to the clothing or skin of a user. The body-side layer is preferably in the form of a fabric layer and more preferably is a knitted polyester fabric. The knitted polyester fabric may be obtained from any suitable source such as Guilford Industries of Greensboro, N.C., U.S.A. However, it is to be understood that the body-side layer may be made of other materials and other knitted, woven or non-woven constructions as desired and as are well known in the art. Preferably the body-side layer is permeable to but does not absorb moisture, and does not shift, flatten, or lump after washing. The body-side layer of the absorbent article positions itself next to the user's skin to prevent chafing, aid in the prevention and aggravation of bed sores and can be used as padding. The body-side layer fabric also absorbs and conducts radiated body heat to the absorbent material which acts to vent such heat through the breathable outer layer thereby reducing heat in the area of the skin tissue of the user. The absorbent material and body-side layer may be held together by stitch means through the two materials pulling the layers together in a plurality of locations and defining a quilted construction.

Instead of an added body-side layer, the method of making the absorbent material of the present invention may incorporate an embossing step wherein a surface of the material is embossed using a heated rolling die. Due to the unique structural properties of the present material, the resulting absorbent material withstands the embossing step without adverse effect to its absorbent properties. The embossed material presents a tight, yet soft body-side layer.

The body-side layer of the absorbent article may have a hydrophilic finish and/or an antimicrobial finish. The hydrophilic finish assures rapid dissipation and absorption of fluid into the absorbent material leaving the entire top surface of the pad coming into contact with the skin or clothing of the user feeling substantially dry. The antimicrobial finish assures that any bacteria coming into contact with the finish will be killed upon continued contact with the finish. Any suitable hydrophilic or antimicrobial finish known in the art may be used. An exemplary hydrophilic finish which has been used is Milatese which is available from Guilford Industries of Greensboro, N.C., USA.

Where the absorbent article is for use as a wound dressing, a suitable non-stick, gauze-like material may be used as the body-side layer. One such material is DELNET, which is available from Foss Manufacturing Company, Inc. of Hampton, N.H., U.S.A.

The layers may be secured together by any suitable means known in the art including binding tape, whip-stitching, adhesives, lamination and the like. For example, for absorbent pads the preferred securing means is binding tape which overlaps the layers of the pad and is bound to the edges of the pad by means of stitching. Stitching surrounds the outer perimeter of the absorbent pad and is stitched to the top and bottom of the binding and through the respective layers. The binding tape surrounds and protects the peripheral edges of the layers and defines the peripheral outline thereof. The binding tape may be any suitable tape known in the art and may be made of any suitable material. Preferably the binding tape is made of polyester.

The article comprising the absorbent material of the present invention is suggested for use as a reusable, washable undergarment or brief or absorbent pad for nursing homes, hospitals and state and federal institutions. For example, an undergarment or pad has particular use in keeping an incontinent patient, a surgical patient or anyone subject to the drainage of body fluids dry and comfortable while also protecting clothing, bedding and other furniture from damage. For this use, the undergarment is worn or the pad is placed on top of the patient's bedding or wheelchair with the outer layer facing against the bedding or chair. Thus, the absorbent material serves to absorb the patient's excrements of fluid while the fluid impervious outer layer prevents these excrements or fluids from passing through and wetting or soiling clothing, the bedding material or the chair fabric upon which the pad is placed. The absorbent article of the present invention can also be used as a mattress pad for a burn bed, a bumper pad, a baby's crib pad, as a diaper or an apron or vest with the same idea incorporated, that the clothing will be protected from liquid. The absorbent pad is easily adaptable for use on a bed, chair, wheelchair, or the like. Absorbent underpads placed on tables such as operating tables, examination tables and the like serve a similar function. Absorbent pads may also be used as sanitary pads adjacent to toilets or urinals and, if flame-resistant, as a safety pad adjacent to stoves or the like where grease and other liquids may be spilled.

The previously described embodiments of the present invention have many advantages, including an aversion to wetting back due to the material's compression resistant properties preventing wet collapse. The fiber structure of the material combined with the high interior void space and surface area results in an absorbent material which effectively and rapidly acquires and holds fluid thereby preventing the fluid from returning to the surface of the material even under pressure. Thus, the liquid stored in the interior of the absorbent is no longer able to penetrate the surface layer to re-wet the exterior.

Further, the open, loose nature of the fabric enhances the absorption capabilities of the present invention. Fluids do not have to penetrate a dense fiber composition, thus eliminating a source of pooling and the need for pressure or effort to push the fluids through the fabric. The absorbency and retentivity of the material of the present invention are of a level normally associated with more highly absorbent materials, including hydrophilic materials such as rayon and cotton which are subject to wet collapse.

Another advantage of the present invention is the material's ability to quickly and permanently remove wetness from its surface. Due to the increased surface area for absorbance within the fabric and the action of the vertical bundles wicking fluid into the interior away from the surfaces and trapping the fluid within the interior of the fabric, the surface of the material feels dry even when a considerable mount of fluid is within the material. Also, once the surface is wetted, the power of the material to draw the fluid into the inner portion provides a dry surface layer. An incontinent undergarment or brief or absorbent pad conforming to the present invention displays the advantage that it can absorb a large quantity of fluid which does not again reach the surface of the absorbent material with the result that the surface of the material becomes dry again. This "stay dry" effect has heretofore not been available in a reusable absorbent material. Thus, the present invention represents the first reusable absorbent material with a stay dry effect with no wet back in combination with dramatic absorbency.

As used in a breathable absorbent article, such as for use by anyone subject to drainage of body fluids, the absorbent material provides maximum absorbency and comfort to persons coming into contact therewith and further results in a dried fluid absorbent layer a very short time after such layer becomes wet. The material is comfortable and does not collapse when wet continuing to provide cushioned protection.

Moreover, the material of the present invention is a durable heavy duty fabric intended primarily for use in reusable and washable undergarments, briefs, pads and other hygiene products. The material is designed to withstand countless machine washings and shows the ability to withstand exposure to soap, bleach, and high temperatures of wash and dry cycles using regular institutional laundry procedures without significant loss in its absorbency or other properties. Because it is manufactured of light-weight materials, it dries rapidly.

The material is available in roll form for easy conversion to pads or other uses. The material is easily cut and trimmed without fraying and produces components with good dimensional stability. Absorbent articles constructed in accordance with the teachings of the present invention may be dispensed individually wrapped and in sterile condition in paper envelopes or in unsterile rolls of the material so that attendants may cut from the rolls pads of desired size. Depending on its use, an absorbent article can be manufactured of any size, such as for the complete protection of a standard hospital bed or for use in a chair or wheelchair. The layers can be dye cut to desired dimensions and the edges can be sealed by binding tape and stitching. Where the article comprises more than two layers it is preferably quilted to prevent the moisture absorbent layer from bunching up or shifting.

Construction of the reusable absorbent material may be shown by the following non-limiting example. A homogenous fiber blend was produced comprising 70% by weight of 1.5 denier, 1.5 inch fibers; 25% by weight of 3 denier, 3 inch fibers; and 5% by weight 7 denier, 3 inch fibers. Prior to being needle punched, the fibers were run through high efficiency cards to produce an open web of about 0.5 to about 1.0 ounces per square yard. The web was then cross-lapped to give a batt with 13 layers. Needle punching was performed using a Fehrer NL/9S tacking loom as the down-punch loom, and a Fehrer NL/21R/S as the up-punch loom. High efficiency 38 gauge tacking needles were used in both needle loom positions. The looms had a needle punch depth of about 0.35 inches and a needle punch density of 840 penetrations per square inch. The finished fabric had a weight of about 13 ounces per square yard and a gauge of about 0.180 inches. As a finishing step, the material was rolled over an oil-heated can at a temperature of about 370° F. The time spent on the can was about 36 seconds. After rolling over the can the fabric was cooled at ambient temperature. The resultant fabric had an absorbency of about 1000%.

While the present invention has been described in considerable detail in connection with particular embodiments thereof, it will be understood, of course, that we do not intend to limit the invention to those embodiments since modifications may be made by those skilled in the art, particularly in light of the foregoing teachings. For example, the disclosed absorbent material may have a myriad of uses outside the personal hygiene and incontinence areas. On the contrary, we intend to cover all alternatives, modifications and equivalents as may be included within the spirit and scope of the invention as defined by the appended claims. It is, therefore, contemplated by the appended claims to cover any such modifications as incorporate those features which constitute the essential features of these improvements within the true spirit and the scope of the invention. Therefore the spirit and scope of the appended claims should not be limited to the description of the preferred versions contained herein.

I claim:

1. An absorbent material, the absorbent material comprising:
    a fiber web including a blend of fibers, the fiber blend comprising:
        from about 50 to about 75 weight percent of a fiber having fineness less than about 3 denier, based on a total weight of the blend, and
        from about 25 to about 50 weight percent of a fiber having fineness ranging from about 3 to about 5 denier, based on a total weight of the blend,
    wherein the fiber web is bonded together by fiber bundles transverse to the plane of the web.

2. An absorbent material as recited in claim 1, wherein the fiber comprising the fiber blend is hydrophobic fiber.

3. An absorbent material as recited in claim 2, wherein the hydrophobic fiber is treated with a hydrophilic finish.

4. An absorbent material as recited in claim 2, wherein the fiber is polyester.

5. An absorbent material as recited in claim 1, wherein the fiber having fineness ranging from about 3 to about 5 denier is hydrophilic fiber.

6. An absorbent material as recited in claim 5, wherein the about 3 to about 5 denier fiber is rayon.

7. An absorbent material as recited in claim 1, wherein the fiber blend further comprises from about 3 to about 7 percent by weight of a fiber having fineness greater than about 5 denier, based on a total weight of the blend.

8. An absorbent material as recited in claim 7, wherein the fiber comprising the fiber blend is hydrophobic fiber.

9. An absorbent material as recited in claim 8, wherein the fiber is polyester.

10. An absorbent material as recited in claim 8, wherein the hydrophobic fiber is treated with a hydrophilic finish.

11. An absorbent material as recited in claim 7, wherein the fiber having fineness ranging from about 3 to about 5 denier is hydrophilic fiber.

12. An absorbent material as recited in claim 11, wherein the about 3 to about 5 denier fiber is rayon.

13. An absorbent material as recited in claim 1, wherein the fiber blend comprises:
    from about 60 to about 70 weight percent of a fiber having fineness less than about 3 denier, based on a total weight of the blend, and
    from about 30 to about 40 weight percent of a fiber having fineness ranging from about 3 to about 5 denier, based on a total weight of the blend.

14. An absorbent material as recited in claim 1, wherein the fiber blend comprises:
    about 70 weight percent of a fiber having fineness less than about 3 denier, based on a total weight of the blend, and about 30 weight percent of a fiber having fineness ranging from about 3 to about 5 denier, based on a total weight of the blend.

15. An absorbent material as recited in claim 1, wherein the fiber blend further comprises from about 4 to about 6 percent by weight of a fiber having fineness greater than about 5 denier, based on a total weight of the blend.

16. An absorbent material as recited in claim 1, wherein the fiber blend further comprises about 5 percent by weight of a fiber having fineness greater than about 5 denier, based on a total weight of the blend.

17. An absorbent article, the article comprising:
    an outer layer, and
    an absorbent layer disposed against the outer layer, the absorbent layer comprising:
        a fiber web including a blend of fibers, the fiber blend comprising:
            from about 50 to about 75 weight percent of a fiber having fineness less than about 3 denier, based on a total weight of the blend, and
            from about 25 to about 50 weight percent of a fiber having fineness ranging from about 3 to about 5 denier, based on a total weight of the blend,
        wherein the fiber web is bonded together by fiber bundles transverse to the plane of the web.

18. An absorbent article as recited in claim 17, wherein the outer layer is fluid impermeable.

19. An absorbent article as recited in claim 18, wherein the outer layer is gas permeable.

20. An absorbent article as recited in claim 17, wherein the outer layer further comprises an inner surface and an outer surface, the outer surface having slip-resistant properties.

21. An absorbent article as recited in claim 17, further comprising a body-side layer wherein the absorbent layer is disposed between the outer layer and the body-side layer.

22. The absorbent pad as recited in claim 21, wherein the body-side layer is a fluid permeable.

23. The absorbent pad as recited in claim 21, wherein the body-side layer and the absorbent layer are held together by stitch means defining a quilted construction.

* * * * *

UNITED STATES PATENT AND TRADEMARK OFFICE
CERTIFICATE OF CORRECTION

PATENT NO. : 5,677,028
DATED : October 14, 1997
INVENTOR(S) : Joseph A. Ravella

It is certified that error appears in the above-identified patent and that said Letters Patent is hereby corrected as shown below:

Column 1, line 37, change "mount" to --amount--.
Column 6, line 19, change "mils" to --rolls--.
Column 9, line 19, change "mimimum" to --minimum--.
Column 9, line 39, change "Herein" to --herein--.
Column 11, line 53, change "mount" to --amount--.

Signed and Sealed this

Third Day of August, 1999

Attest:

Q. TODD DICKINSON

Attesting Officer

Acting Commissioner of Patents and Trademarks